US009947137B2

(12) United States Patent
Yoon et al.

(10) Patent No.: US 9,947,137 B2
(45) Date of Patent: Apr. 17, 2018

(54) METHOD FOR EFFECT DISPLAY OF ELECTRONIC DEVICE, AND ELECTRONIC DEVICE THEREOF

(71) Applicant: Samsung Electronics Co., Ltd., Gyeonggi-do (KR)

(72) Inventors: Pil-Joo Yoon, Gyeonggi-do (KR); Doo-Suk Kang, Gyeonggi-do (KR); Geon-Soo Kim, Gyeonggi-do (KR); Dong-Hyun Yeom, Gyeonggi-do (KR); Bo-Kun Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 162 days.

(21) Appl. No.: 14/547,454

(22) Filed: Nov. 19, 2014

(65) Prior Publication Data

US 2015/0138234 A1 May 21, 2015

(30) Foreign Application Priority Data

Nov. 19, 2013 (KR) ........................ 10-2013-0140489

(51) Int. Cl.
*G09G 5/00* (2006.01)
*G06T 19/00* (2011.01)
*G06F 17/30* (2006.01)

(52) U.S. Cl.
CPC ...... *G06T 19/006* (2013.01); *G06F 17/30265* (2013.01)

(58) Field of Classification Search
None
See application file for complete search history.

(56) References Cited

U.S. PATENT DOCUMENTS 4,905,296 A 2/1990 Nishihara
5,588,048 A * 12/1996 Neville ............... H04M 3/4872 379/127.01
6,665,677 B1 * 12/2003 Wotring ............ G06F 17/30569
7,774,815 B1 * 8/2010 Allen ................. H04N 5/44513 725/51
9,275,148 B1 * 3/2016 Elassaad ........... G06F 17/30864
2003/0174147 A1 * 9/2003 Jaffe ....................... G06F 17/10 345/633
2011/0158478 A1 * 6/2011 Yamada ............... G02B 6/0006 382/103
2011/0283326 A1 * 11/2011 Jung ................ H04N 21/41407 725/62

(Continued)

FOREIGN PATENT DOCUMENTS

KR 10-2006-0021001 A 3/2006
KR 10-1170490 B1 7/2012

(Continued)

*Primary Examiner* — David H Chu
(74) *Attorney, Agent, or Firm* — Cha & Reiter, LLC

(57) ABSTRACT

A method for effect display of an electronic device, and the electronic device thereof are provided. The method in the electronic device includes obtaining a correlation among a plurality of objects extracted from an image, and displaying at least any one of the plurality of objects by adding an effect, on the basis of the correlation. Further, other exemplary embodiments are also included in the present disclosure in addition to the aforementioned exemplary embodiments.

12 Claims, 18 Drawing Sheets

START
REPRODUCE STILL IMAGE OR VIDEO ~S100
S101 IS EFFECT DISPLAY REQUESTED? NO / YES
CAPTURE IMAGE CURRENTLY DISPLAYED ~S102
PERFORM IMAGE SCAN OPERATION USING WINDOW ~S110
EXTRACT BRIGHTNESS/COLOR /EDGE/PATTERN/SHAPE ~S111
S120 IS FEATURE OF MULTIPLE OBJECTS EXTRACTED? NO / YES
COMPARE WITH OBJECT DATABASE ~S121
RECOGNIZE MULTIPLE OBJECTS ~S122
COMPARE WITH CORRELATION DATABASE ~S130
OBTAIN CORRELATION AMONG MULTIPLE OBJECTS ~S131
A

(56) References Cited

U.S. PATENT DOCUMENTS

2012/0019557 A1* 1/2012 Aronsson ................ G06T 11/00 345/633
2012/0044263 A1* 2/2012 Kim .................. G06F 17/30247 345/633
2012/0116728 A1* 5/2012 Shear ...................... G06F 17/50 703/1
2013/0100165 A1* 4/2013 Komiyama ............ G09G 5/397 345/634
2013/0113827 A1* 5/2013 Forutanpour ......... G06T 3/4038 345/633
2013/0201185 A1* 8/2013 Kochi ..................... G06F 3/011 345/419
2013/0304558 A1* 11/2013 Lange ................ G06Q 30/0226 705/14.27
2013/0317912 A1* 11/2013 Bittner ............... G06Q 30/0267 705/14.64
2014/0002643 A1* 1/2014 Aziz ................. H04M 1/72522 348/143
2014/0047334 A1* 2/2014 Nouard .............. G06Q 30/0185 715/705
2014/0132629 A1* 5/2014 Pandey ................ G02B 27/017 345/633
2014/0204118 A1* 7/2014 Berry .................... G06T 19/006 345/633
2014/0292810 A1* 10/2014 Tsurumi .................. G06T 11/00 345/633
2014/0368542 A1* 12/2014 Tawara ................. G06T 19/006 345/633

FOREIGN PATENT DOCUMENTS

KR 10-1176743 B1 8/2012
KR 10-2013-0052625 A 5/2013

* cited by examiner

Object Database

| Object_ID | Feature |
|---|---|
| Object 1 | Y, Color, Edge, Pattern, Shape |
| Object 2 | Y, Color, Edge, Pattern, Shape |
| Object 3 | Y, Color, Edge, Pattern, Shape |
| ⋮ | ⋮ |
| Object 1-1 | Y, Color, Edge, Pattern, Shape |
| Object 1-2 | Y, Color, Edge, Pattern, Shape |
| Object 2-1 | Y, Color, Edge, Pattern, Shape |
| ⋮ | ⋮ |
| Object 1-1-1 | Y, Color, Edge, Pattern, Shape |
| Object 1-1-2 | Y, Color, Edge, Pattern, Shape |
| Object 1-2-1 | Y, Color, Edge, Pattern, Shape |
| Object 1-2-2 | Y, Color, Edge, Pattern, Shape |
| Object 2-1-1 | Y, Color, Edge, Pattern, Shape |
| ⋮ | ⋮ |

FIG.4

Correlation Database

| Category 1 | Category 2 | Category 3 | Correlation ID |
|---|---|---|---|
| Object 1 | Object 1-1 | Object 1-1-1 | Correlation 1 |
| | | Object 1-1-2 | Correlation 2 |
| | | Object 1-1-3 | Correlation 3 |
| | Object 1-2 | Object 1-2-1 | Correlation 4 |
| | | Object 1-2-2 | Correlation 5 |
| | -- | -- | -- |
| Object 2 | Object 2-1 | Object 2-2-1 | Correlation k+1 |
| | | Object 2-2-2 | Correlation k+2 |
| | -- | -- | -- |
| Object 3 | Object 3-1 | Object 3-1-1 | Correlation m+1 |
| | Object 3-2 | Object 3-2-1 | Correlation m+2 |
| | | Object 3-2-2 | Correlation m+3 |
| | -- | -- | -- |
| -- | -- | -- | -- |

FIG.5

Correlation Database

| Object | | | Correlation ID |
|---|---|---|---|
| Object 1 | Object 1-1 | Object 1-1-1 | Correlation 1 |
| Object 1 | Object 1-1 | Object 1-1-2 | Correlation 2 |
| Object 1 | Object 1-1 | Object 1-1-3 | Correlation 3 |
| Object 1 | Object 1-2 | Object 1-2-1 | Correlation 4 |
| Object 1 | Object 1-2 | Object 1-2-2 | Correlation 5 |
| - - | - - | - - | - - |
| Object 2 | Object 2-1 | Object 2-2-1 | Correlation k+1 |
| Object 2 | Object 2-1 | Object 2-2-2 | Correlation k+2 |
| - - | - - | - - | - - |
| Object 3 | Object 3-1 | Object 3-1-1 | Correlation m+1 |
| Object 3 | Object 3-2 | Object 3-2-1 | Correlation m+2 |
| Object 3 | Object 3-2 | Object 3-2-2 | Correlation m+3 |
| - - | - - | - - | - - |

FIG.6

Effect Database

| Correlation ID | Target Object | Effect |
|---|---|---|
| Correlation 1 | Object 1-1-1 | Visual # |
| Correlation 2 | Object 1-1 | Visual #, Audio# |
| Correlation 3 | Object 1-1-3 | Visual #, Audio#, Action Linker # |
| Correlation 4 | Object 1-2 | Visual #, Audio# |
| Correlation 5 | Object 1 | Visual # |
| -- | -- | -- |
| Correlation k+1 | Object 2-1 | Visual #, Audio# |
| Correlation k+2 | Object 2-2-2 | Visual #, Audio#, Action Linker # |
| -- | -- | -- |
| Correlation m+1 | Object 3-1-1 | Visual #, Audio# |
| Correlation m+2 | Object 3-2-1 | Visual #, Audio# |
| Correlation m+3 | Object 3 | Visual #, Audio#, Action Linker # |
| -- | -- | -- |

FIG.7

Correlation & Effect Database

| Category 1 | Category 2 | Category 3 | Correlation ID | Target Object | Effect |
|---|---|---|---|---|---|
| Object 1 | Object 1-1 | Object 1-1-1 | Correlation 1 | Object 1-1-1 | Visual # |
| | | Object 1-1-2 | Correlation 2 | Object 1-1 | Visual #, Audio# |
| | | Object 1-1-3 | Correlation 3 | Object 1-1-3 | Visual#, Audio#, Linker# |
| | Object 1-2 | Object 1-2-1 | Correlation 4 | Object 1-2 | Visual #, Audio# |
| | | Object 1-2-2 | Correlation 5 | Object 1 | Visual # |
| | -- | -- | -- | -- | -- |
| Object 2 | Object 2-1 | Object 2-2-1 | Correlation k+1 | Object 2-1 | Visual #, Audio# |
| | | Object 2-2-2 | Correlation k+2 | Object 2-2-2 | Visual#, Audio#, Linker# |
| | -- | -- | -- | -- | -- |
| -- | -- | -- | -- | -- | -- |

FIG.8

| Correlation ID | Taget Object | Effect |
|---|---|---|
| Correlation N | Object 2 | Visual#, Audio#, Action Linker |

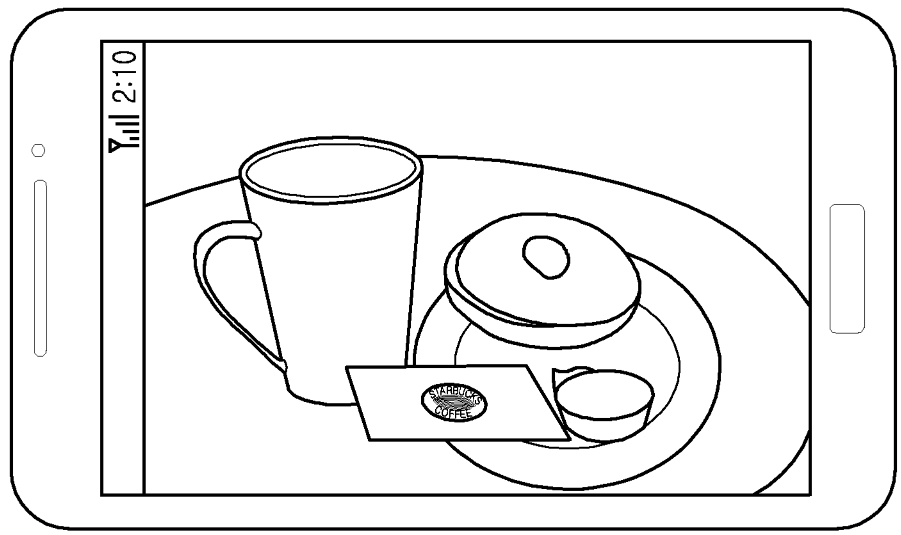
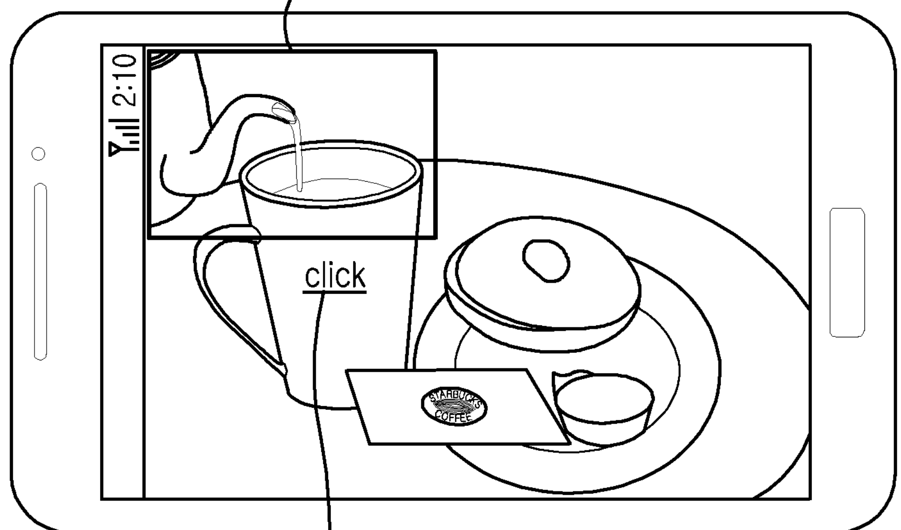
FIG.15

METHOD FOR EFFECT DISPLAY OF ELECTRONIC DEVICE, AND ELECTRONIC DEVICE THEREOF

CLAIM OF PRIORITY

This application claims the benefit under 35 U.S.C. § 119(a) of a Korean patent application filed in the Korean Intellectual Property Office on Nov. 19, 2013 and assigned Serial No. 10-2013-0140489, the entire disclosure of which is hereby incorporated by reference.

BACKGROUND

1. Field of the Disclosure

The present disclosure relates to a method for effect display of an electronic device, and the electronic device thereof.

2. Description of the Related Art

Objects may be displayed by using various techniques, such as Virtual Reality (VR), Augmented Reality (AR), and the like. VR is a technique which permits a user to be immersed into a virtual world. AR is a technique for displaying objects by superimposing the objects onto real-word images. When VR is used, the user is immersed in a virtual environment and thus cannot see the user's actual environment, whereas when AR is used, the actual environment is mixed with a virtual object, and thus the user can see the actual environment.

SUMMARY

According to one aspect of the disclosure, a method is provided comprising: identifying a group of objects in a media item; retrieving, by an electronic device, a plurality of object identifiers, wherein each one of the plurality of object identifiers corresponds to a different object from the group; retrieving, by the electronic device, a group identifier based on the plurality of object identifiers; selecting, by the electronic device, a first object from the group based on the group identifier; and modifying the media item by applying an effect to the first object.

According to another aspect of the disclosure, an electronic device is provided comprising a processor configured to: identify a group of objects in a media item; retrieve a plurality of object identifiers, wherein each one of the plurality of object identifiers corresponds to a different object from the group; retrieve a group identifier based on the plurality of object identifiers; select a first object from the group based on the group identifier; and modify the media item by applying an effect to the first object.

BRIEF DESCRIPTION OF THE DRAWINGS

The above and other aspects, features and advantages of the disclosed subject matter will be more apparent from the following detailed description taken in conjunction with the accompanying drawings, in which:

FIG. 4 is a schematic diagram illustrating an example of an object database, according to various aspects of the disclosure;

FIG. 5 is a schematic diagram illustrating an example of a correlation database, according to aspects of the disclosure;

FIG. 6 is a schematic diagram illustrating another example of a correlation database, according to aspects of the disclosure;

FIG. 7 is a schematic diagram of an example of an effect database, according to aspects of the disclosure;

FIG. 8 is a schematic diagram of an example of a combined correlation and effect database;

FIG. 15 and FIG. 16 are diagrams illustrating examples of effects that can be applied to a media item, according to aspects of the disclosure;

DETAILED DESCRIPTION

Figure 1:
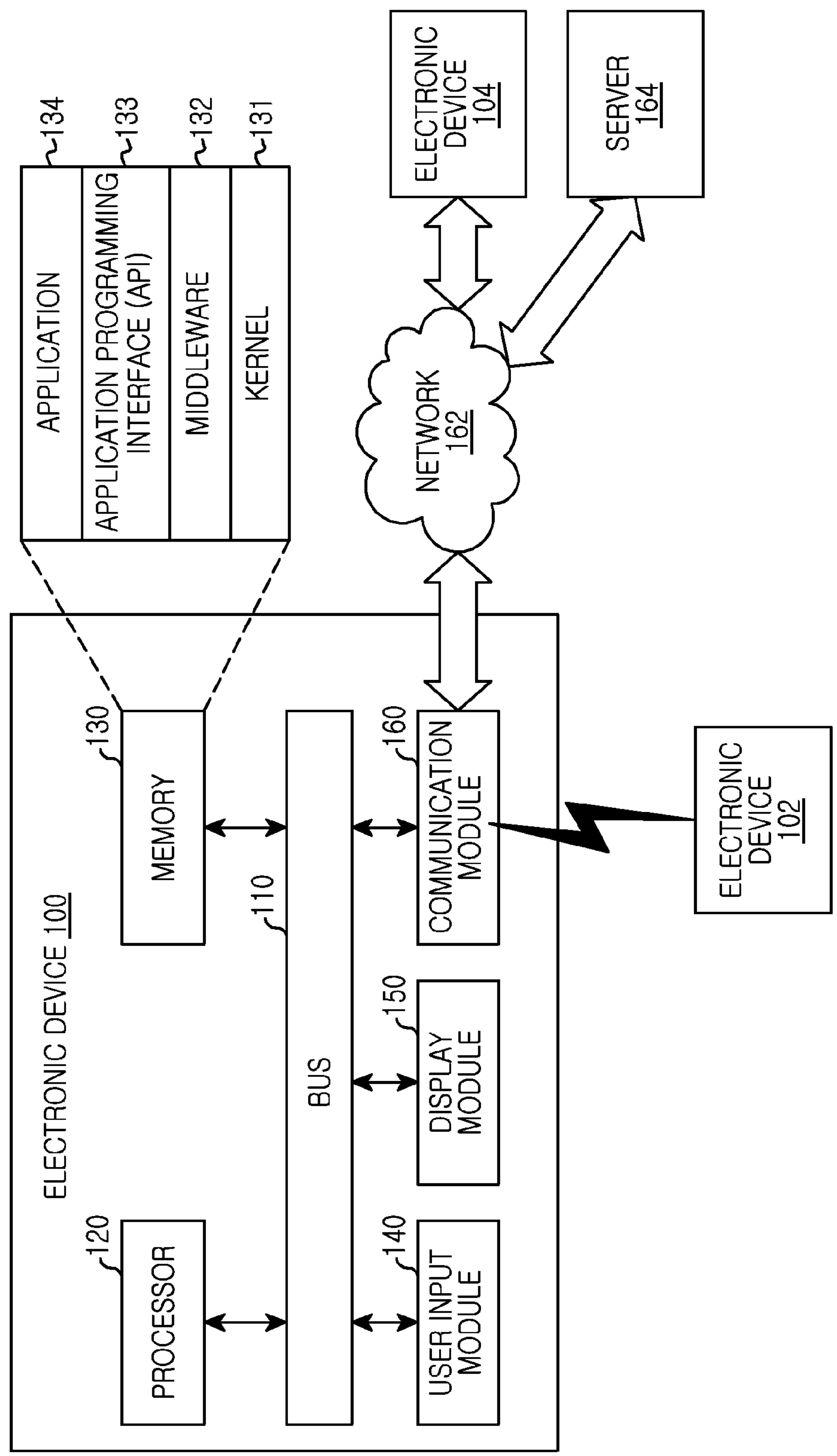
FIG. 1 is a block diagram of an example of an electronic device, according to aspects of the disclosure.

Hereinafter, the present disclosure is provided with reference to the accompanying drawings. It should be understood that the disclosure is not limited to the examples provided herein, and that it is intended to cover all modifications, equivalent, and alternatives falling within the spirit and scope of the present disclosure as defined by the appended claims. Like reference numerals denote like constitutional elements throughout the drawings.

An electronic device according to aspects of the disclosure may be a device including a communication function. For example, the electronic device may be one or more combinations of various devices such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligent robot, a TeleVision (TV), a Digital Video Disk (DVD) player, an audio, an oven, a microwave oven, a washing machine, an air purifier, an electronic picture frame, etc.), various medical devices (e.g., Magnetic Resonance Angiography (MRA), Magnetic Resonance Imaging (MRI), Computed Tomography (CR), imaging equipment, ultrasonic instrument, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship (e.g., a vessel navigation device, a gyro compass, etc.), avionics, a security device, an electronic costume, an electronic key, a camcorder, game consoles, a Head-Mounted Display (HMD), a flat panel display device, an electronic album, a furniture or a part of building/constructions including a communication function, an electronic board, an electronic signature receiving device, a projector, and the like. It is apparent to those ordinarily skilled in the art that the electronic device according to the present disclosure is not limited to the aforementioned devices.

FIG. 1 is a block diagram of an example of an electronic device, according to aspects of the disclosure. Referring to FIG. 1, an electronic device 100 may include a bus 110, a processor 120, a memory 130, a user input module 140, a display module 150, and a communication module 160. The bus 110 may be a circuit for connecting the aforementioned constitutional elements to each other and for delivering a communication (e.g., a control message) between the aforementioned constitutional elements.

The processor 120 may include any suitable type of processing circuitry, such as a general purpose processor (e.g., an ARM-based processor, a MIPS-based processor, or an x86-based processor), a Field Programmable Gate Array (FPGA), or an Application-Specific Integrated Circuit (ASIC). The processor 120 may receive an instruction from the aforementioned different constitutional elements (e.g., the memory 130, the input/output interface 140, the display 150, the communication interface 160, etc.), for example, via the bus 110, and thus may interpret the received instruction and execute arithmetic or data processing according to the interpreted instruction. The memory 130 may store an instruction or data received from the processor 120 or different constitutional elements (e.g., the input/output interface 140, the display 150, the communication interface 160, etc.) or generated by the processor 120 or the different constitutional elements.

The memory 130 may include any suitable type of volatile and non-volatile memory. The memory 130 may include programming modules, such as a kernel 131, a middleware 132, an Application Programming Interface (API) 133, an application 134, and the like. Each of the aforementioned programming modules may include software, firmware, or hardware entities or may include at least two or more combinations thereof. The kernel 131 may control or manage the remaining other programming modules such as system resources (e.g., the bus 110, the processor 120, the memory 130, etc.) used to execute an operation or function implemented in the middleware 132, the API 133, or the application 134.

The kernel 131 may provide a controllable or manageable interface by accessing individual constitutional elements of the electronic device 100 in the middleware 132, the API 133, or the application 134. The middleware 132 may perform a mediation role so that the API 133 or the application 134 communicates with the kernel 131 to exchange data. Regarding task requests received from the (plurality of) applications 134, the middleware 132 may perform load balancing for the task request, for example, by using a method of assigning a priority or the like capable of using a system resource (e.g., the bus 110, the processor 120, the memory 130, etc.) of the electronic device 100 to at least one application among the (plurality of) applications 134.

The API 133 is an interface capable of controlling a function provided by the application 134 in the kernel 131 or the middleware 132, and may include, for example, at least one interface or function for file control, window control, video processing, or character control, and the like.

The user input module 140 may receive an instruction or data, for example, from a user and may deliver it to the processor 120 or the memory 130 via the bus 110. The display module 150 may display video, image, data, and the like, to the user. The communication module 160 may connect a communication between another electronic device 102 and the electronic device 100. The communication module 160 may support a specific near-field communication protocol (e.g., Wireless Fidelity (WiFi), Bluetooth (BT), Near Field Communication (NFC), or specific network communication 162 (e.g., Internet, Local Area Network (LAN), Wide Area Network (WAN), telecommunication network, cellular network, satellite network, Plain Old Telephone Service (POTS), etc.). Each of the electronic devices 102 and 104 may be a device which is the same (e.g., the same type) as the electronic device 100 or may be a different (e.g., a different type of) device.

Figure 2:
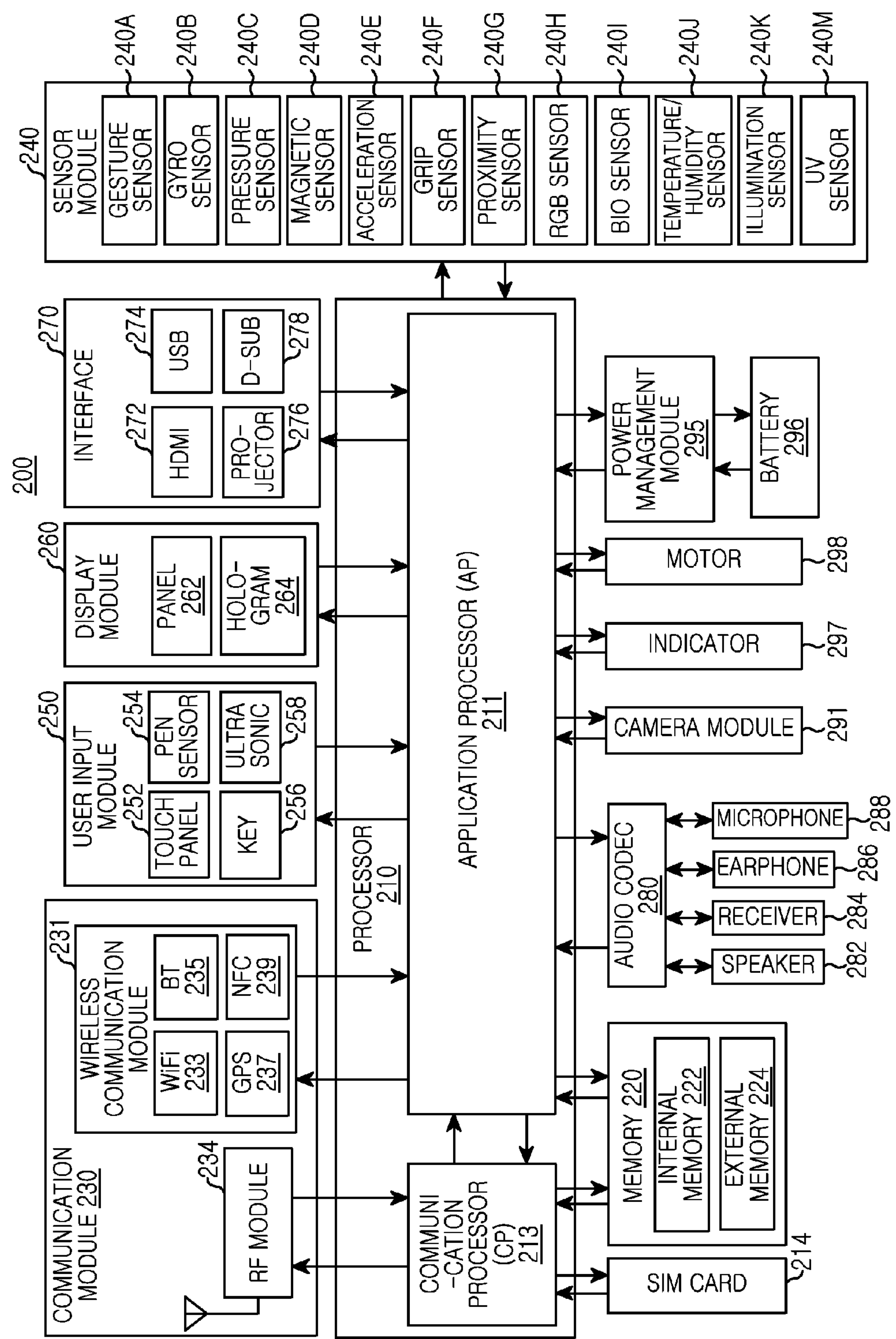
FIG. 2 is a block diagram of an example of a hardware structure, according to aspects of the disclosure.

FIG. 2 is a block diagram of an example of a hardware structure, according to aspects of the disclosure. Hardware 200 may be, for example, the electronic device 100 of FIG. 1. Referring to FIG. 2, the hardware 200 may include one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, or a motor 298.

The processors 210 (e.g., the processor 120) may include one or more Application Processors (APs) 211 or one or more Communication Processors (CPs) 213. The processor 210 may be, for example, the processor 120 of FIG. 1. Although it is described in FIG. 2 that the AP 211 and the CP 213 are included in the processor 210, the AP 211 and the CP 213 may be respectively included in different Integrated Circuit (IC) packages. According to aspects of the disclosure, the AP 211 and the CP 213 may be included in one IC package.

The AP 211 may control a plurality of hardware or software constitutional elements connected to the AP 211 by driving an operating system or an application program, and may perform a variety of data processing and computation including multimedia data. The AP 211 may be implemented, for example, with a System on Chip (SoC). According to aspects of the disclosure, the processor 210 may further include a Graphic Processing Unit (GPU, not shown).

The CP 213 may perform a function of managing a data link and converting a communication protocol in a communication between different electronic devices connected with an electronic device (e.g., the electronic device 100) including the hardware 200 through a network. The CP 213 may be implemented, for example, with an SoC. According to aspects of the disclosure, the CP 213 may perform at least a part of a multimedia control function. The CP 213 may identify and authenticate a terminal in a communication network, for example, by using a Subscriber Identification Module (SIM) (e.g., the SIM card 214). In addition, the CP 213 may provide the user with services such as voice telephony, video telephony, text messages, packet data, and the like.

In addition, the CP 213 may control data transmission/reception of the communication module 230. Although it is illustrated in FIG. 2 that the constitutional elements such as the CP 213, the power management module 295, the memory 220, and the like are separate constitutional elements independent of the AP 211, the AP 211 may be implemented to include at least a part (e.g., the CP 213) of the aforementioned constitutional elements. According to aspects of the disclosure, the AP 211 or the CP 213 may load an instruction or data, received from a non-volatile memory connected thereto or at least one of other constitutional elements, to a volatile memory and then may process the instruction or data. In addition, the AP 211 or the CP 213 may store data, received from the at least one of other constitutional elements or generated by the at least one of other constitutional elements, into the non-volatile memory.

The SIM card 214 may be a card in which a SIM is implemented, and may be inserted to a slot formed at a specific location of the electronic device. The SIM card 214 may include unique identification information (e.g., an Integrated Circuit Card Identifier (ICCID)) or subscriber information (e.g., an International Mobile Subscriber Identity (IMSI)). The memory 220 may include an internal memory 222 or an external memory 224. The memory 220 may be, for example, the memory 130 of FIG. 1. The internal memory 222 may include at least one of a volatile memory (e.g., a Dynamic RAM (DRAM), a Static RAM (SRAM), a Synchronous Dynamic RAM (SDRAM), etc.) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.). According to aspects of the disclosure, the internal memory 222 may have a form of a Solid State Drive (SSD). The external memory 224 may further include, for example, Compact Flash (CF), Secure Digital (SD), Micro Secure Digital (Micro-SD), Mini Secure Digital (Mini-SD), extreme Digital (xD), memory stick, and the like.

The communication module 230 may include a wireless communication module 231 or a Radio Frequency (RF) module 234. The communication module 230 may be, for example, the communication module 160 of FIG. 1. The wireless communication module 231 may include, for example, a WiFi 233, a BlueTooth (BT) 235, a Global Positioning System (GPS) 237, or a Near Field Communication (NFC) 239. For example, the wireless communication module 231 may provide a wireless communication function by using a radio frequency. Additionally or alternatively, the wireless communication module 231 may include a network interface (e.g., a LAN card), modem, or the like for connecting the hardware 200 to a network (e.g., Internet, LAN, WAN, telecommunication network, cellular network, satellite network, POTS, etc.).

The RF module 234 may serve to transmit/receive data, for example, an RF signal or a paged electronic signal. Although not shown, the RF module 234 may include, for example, a transceiver, a Power Amp Module (PAM), a frequency filter, a Low Noise Amplifier (LNA), and the like. In addition, the RF module 234 may further include a component (e.g., a conductor, a conducting wire, etc.) for transmitting/receiving a radio wave on a free space in a wireless communication.

The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a Red, Green, Blue (RGB) sensor 240H, a bio sensor 240I, a temperature/humidity sensor 240J, an illumination sensor 240K, and an Ultra Violet (UV) sensor 240M. The sensor module 240 may measure a physical quantity or detect an operation state of the electronic device, and thus may convert the measured or detected information into an electric signal.

Additionally/alternatively, the sensor module 240 may include, for example, an E-node sensor (not shown), an ElectroMyoGraphy (EMG) sensor (not shown), an ElectroEncephaloGram (EEG) sensor (not shown), an ElectroCardioGram (ECG) sensor (not shown), a fingerprint sensor, and the like. The sensor module 240 may further include a control circuit for controlling at least one or more sensors included therein.

The user input module 250 may include a touch panel 252, a (digital) pen sensor 254, a key 256, or an ultrasonic input unit 258. The user input module 250 may be, for example, the user input module 140 of FIG. 1. The touch panel 252 may recognize a touch input, for example, by using at least one of an electrostatic type, a pressure-sensitive type, an infrared type, and an ultrasonic type. In addition, the touch panel 252 may further include a controller (not shown). In case of the electrostatic type, not only direct touch but also proximity recognition is also possible. The touch penal 252 may further include a tactile layer. In this case, the touch panel 252 may provide the user with a tactile reaction.

The (digital) pen sensor 254 may be implemented, for example, by using the same or similar method of receiving a user input or by using an additional sheet for recognition. The key 256 may be, for example, a keypad or a touch key. The ultrasonic input unit 258 is a device by which the terminal detects a sound wave by using a microphone (e.g., the microphone 288) through a pen which generates an ultrasonic signal, and is a device capable of radio recognition. According to aspects of the disclosure, the hardware 200 may use the communication module 230 to receive a user input from an external device (e.g., a network, a computer, or a server) connected thereto.

The display module 260 may include a panel 262 or a hologram 264. The display module 260 may be, for example, the display module 150 of FIG. 1. The panel 262 may be, for example, a Liquid-Crystal Display (LCD), an Active-Matrix Organic Light-Emitting Diode (AM-OLED), and the like. The panel 262 may be implemented, for example, in a flexible, transparent, or wearable manner. The panel 262 may be constructed as one module with the touch panel 252. The hologram 264 may use an interference of light and show a stereoscopic image in the air. According to aspects of the disclosure, the display module 260 may further include a control circuit for controlling the panel 262 or the hologram 264.

The interface 270 may include, for example, a High-Definition Multimedia Interface (HDMI) 272, a Universal Serial Bus (USB) 274, a projector 276, or a D-subminiature (D-sub) 278. Additionally or alternatively, the interface 270 may include, for example, Secure Digital (SD)/Multi-Media Card (MMC) (not shown) or Infrared Data Association (IrDA) (not shown).

The audio codec 280 may bilaterally convert a voice and electronic signal. The audio codec 280 may convert audio information which is input or output, for example, through a speaker 282, a receiver 284, an earphone 286, the microphone 288, and the like. The camera module 291 is a device for image and video capturing, and according to aspects of the disclosure, may include one or more image sensors (e.g., a front lens or a rear lens), an Image Signal Processor (ISP) (not shown), or a flash Light Emitting Diode (LED) (not shown).

The power management module 295 may manage power of the hardware 200. Although not shown, the power management module 295 may include, for example, a Power Management Integrated Circuit (PMIC), a charger Integrated Circuit (IC), or a battery fuel gauge. The PMIC may be equipped, for example, inside an IC or SoC semiconductor. Charging may be classified into wired charging and wireless charging. The charger IC may charge a battery, and may avoid over-voltage or over-current flowing from a charger. According to aspects of the disclosure, the charger IC may further include a charger IC for at least one of the wired charging and the wireless charging. The wireless charging may be classified, for example, into a magnetic resonance type, a magnetic induction type, and an electromagnetic type. An additional circuit (e.g., a coil loop, a resonant circuit, a rectifier, etc.) may be added for the wireless charging.

The battery gauge may measure, for example, a residual quantity of the battery 296 and a voltage, current, and temperature during charging. The battery 296 may generate electricity to supply power source, and may be, for example, a rechargeable battery. The indicator 297 may indicate a specific state, e.g., a booting state, a message state, a charging state, and the like of the hardware 200 or a part thereof (e.g., the AP 211). The motor 298 may convert an electric signal into a mechanical vibration. A Micro Control Unit (MCU) (not shown) may control the sensor module 240. Although not shown, the hardware 200 may include a processing unit (e.g., a GPU) for supporting a mobile TV. The processing unit for supporting the mobile TV may process media data according to a protocol of, for example, Digital Multimedia Broadcasting (DMB), Digital Video Broadcasting (DVB), media flow, and the like.

It is to be understood that the names of the aforementioned elements of the hardware, according to aspects of the disclosure, may vary depending on a type of electronic device. The hardware of the present disclosure may include at least one of the aforementioned elements. Some of the elements may be omitted, or additional other elements may be further included. In addition, some of the aforementioned elements may be integrated together.

Figure 3:
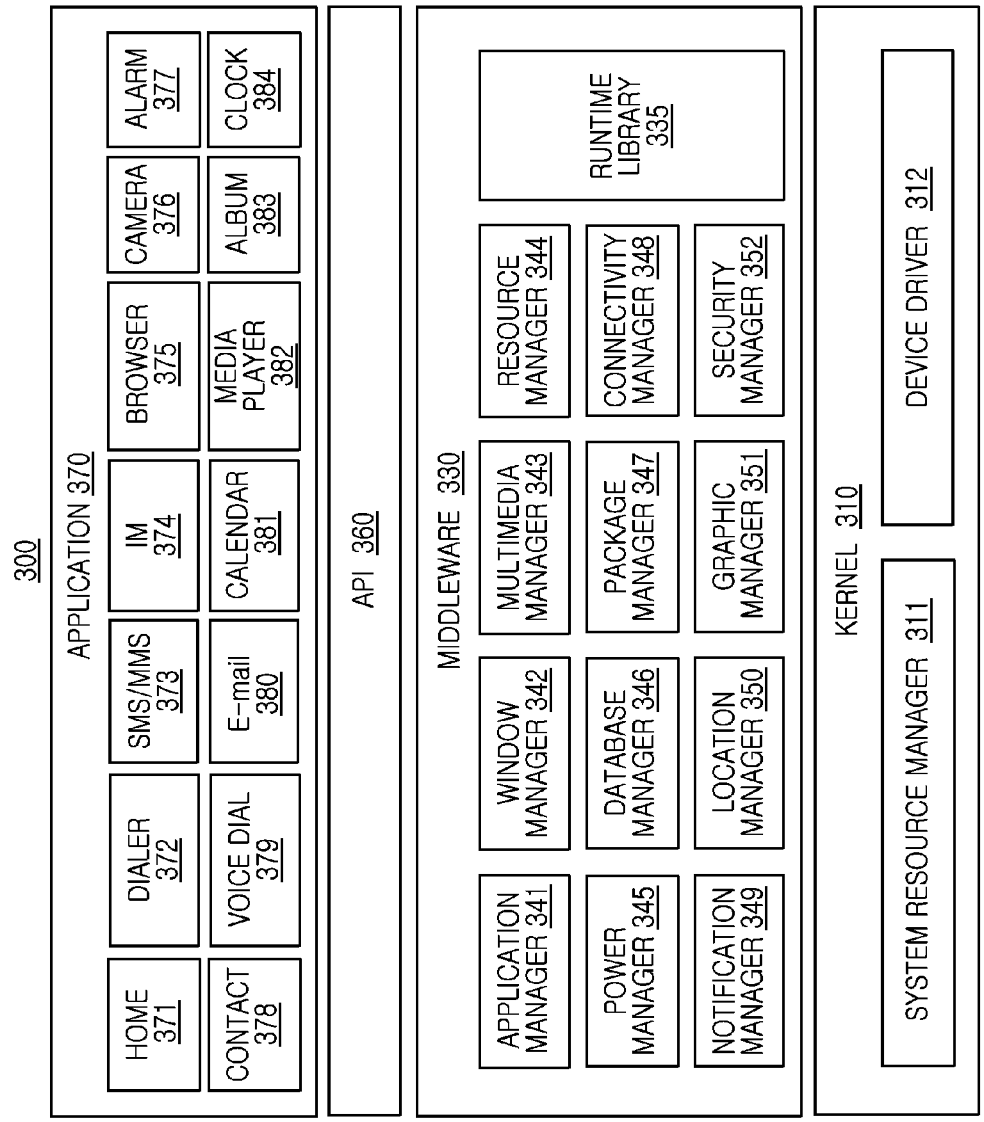
FIG. 3 is a block diagram of an example of a programming module, according to aspects of the disclosure.

FIG. 3 is a block diagram of an example of a programming module, according to aspects of the disclosure. A programming module 300 may be included (e.g., stored) in the electronic device 100 (e.g., the memory 130) of FIG. 1. At least some parts of the programming module 300 include software, firmware, hardware, or a combination of at least two or more of them.

The programming module 300 may include an Operating System (OS) implemented in a hardware (e.g., the hardware 200) and controlling a resource related to an electronic device (e.g., the electronic device 100) or various applications (e.g., an application 370) driven on the OS. For example, the OS may be Android, iOS, Windows, Symbian, Tizen, Bada, and the like. Referring to FIG. 3, the programming module 300 may include a kernel 310, a middleware 330, an Application Programming Interface (API) 360, or the application 370.

The kernel 310 (e.g., the kernel 131) may include a system resource manager 311 or a device driver 312. In addition, according to aspects of the disclosure, the device driver 312 may include an Inter-Process Communication (IPC) driver (not shown). The middleware 330 may include a plurality of modules pre-implemented to provide a function commonly required by the application 370. In addition, the middleware 330 may provide a function through the API 360 so that the application 370 can effectively use a limited system resource in the electronic device. For example, as shown in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is executed. According to aspects of the disclosure, the runtime library 335 may perform an operation of an input/output, a memory management, an arithmetic function, and the like. The application manager 341 may, for example, manage a life cycle of at least one application among the applications 370. The window manager 342 may manage a Graphic User Interface (GUI) resource used in a screen.

The multimedia manager 343 may recognize a format required to reproduce various media files, and may use a code suitable for the format to perform encoding or decoding of the media file. The resource manager 344 may manage a resource (e.g., a source code, a memory, a storage space, etc.) of at least any one of the applications 370. The power manager 345 may manage a battery or power by operating together with a Basic Input/Output System (BIOS) and the like, and may provide power information and the like required for the operation. The database manager 346 may manage to generate, search, or change a database to be used in at least one application among the applications 370.

The package manager 347 may manage an installation or update of an application distributed in a form of a package file. The connectivity manager 348 may manage a wireless connection such as WiFi, Bluetooth, and the like. The notification manager 349 may display or notify an event such as an incoming message, an appointment, a proximity notification, and the like, in a manner of not disturbing the user. The location manager 350 may manage location information of the electronic device.

The graphic manager 351 may manage a graphic effect to be provided to the user or a user interface related thereto. The security manager 352 may provide a general security function required for system security, user authentication, and the like. If the electronic device (e.g., the electronic device 100) has a telephone function, the middleware 330 may further include a telephony manager (not shown) for managing a voice or video telephony function of the electronic device.

The middleware 330 may generate and use a new middleware module by combining various functions of the aforementioned internal constitutional modules. The middleware 330 may provide a module specified for each type of operating system to provide a differentiated function. In addition, the middleware 330 may dynamically delete some of the existing constitutional elements or may add new constitutional elements. Accordingly, some of the constitutional elements described in the disclosure may be omitted, or other constitutional elements may be further included or may be replaced with constitutional elements having other names for performing a similar function.

The API 360 (e.g., the API 133) is a set of API programming functions, and may be provided with other configurations according to an operating system. In case of Android or IOS, one API set may be provided, for example, for each platform, and in case of Tizen, two or more API sets may be provided. The application 370 (e.g., the application 134) may include, for example, a preloaded application or a third party application.

At least some parts of the programming module 300 may be implemented with an instruction stored in a computer-readable storage media. If it is executed by one or more processors (e.g., the processor 210), the one or more processors perform a function corresponding to the instruction. The computer-readable storage media may be, for example, the memory 260. At least some parts of the programming module 300 may be implemented (e.g., executed), for example, by the processor 210.

At least some parts of the programming module 300 may include, for example, modules, programs, routines, instructions sets, processes, and the like for performing one or more functions. Names of constitutional elements of the programming module (e.g., the programming module 300) according to aspects of the disclosure may vary depending on a type of operating system. In addition, the programming module according to aspects of the disclosure may further include at least one or more constitutional elements among the aforementioned constitutional elements, or some of them may be omitted, or additional other constitutional elements may be further included.

Hereinafter, a process for effect display of content is provided. The method may be implemented using an electronic device. The electronic device according to the various aspects of the disclosure may include the elements discussed with respect to FIG. 3. The processor 210 of the electronic device may control an operation of the display module 260, the application processor 211, and the like, and thus may capture various types of images such as a photo and the like displayed to the display module 260.

According to the process, a still image of a video displayed to the display module 260 may be captured. A plurality of objects may be extracted from the captured one image, or the plurality of objects may be separately extracted from a plurality of different images. For example, an object 1 may be extracted from a currently displayed image, and an object 2 may be extracted from an image to be displayed next.

After obtaining a correlation among the extracted plurality of objects, a target object to which various effects (e.g., a text, an image, a video, an audio, an action linker, etc.) are applied may be selected on the basis of the correlation. The processor 210 may display the target object by using various effects such as AR, VR, and the like.

FIG. 4 is a schematic diagram illustrating an example of an object database, according to aspects of the disclosure. As illustrated, the database may relate object identifiers to corresponding object characteristics. The object characteristics may include, brightness (Y), color, edge, pattern, shape, and/or any other suitable object characteristic.

The object database may be used to identify objects based on their features. For example, the processor 210 may identify a given object by identifying one or more characteristics of the given object (e.g., brightness, color, edge, pattern, and shape) and comparing the extracted features against the object database. For example, if the any one object is a well-known logo, the object can be easily identified by using pattern matching.

The object database may be stored, for example, in the memory 130 of the electronic device of FIG. 1 or may be stored in the server 164 of FIG. 1. If it is stored in the server 164, the processor 210 may communicate with the server 164 via the communication module 230 to search the object database. In some implementations, the objects database may be persistently updated by using, for example, a neural network technique.

FIG. 5 is a schematic diagram illustrating an example of a correlation database, according to aspects of the disclosure. In one aspect, the database identifies a hierarchical relationship between different objects in a group. For example, an object from a higher category (e.g., a category 1) may be associated by the database with one or more objects from lower categories(s) (e.g., categories 2 and 3). In another aspect, the database may identify different groups of objects, as illustrated. For each of the identified object groups, the database may provide a correlation ID and/or any other suitable type of group ID.

The correlation database may be used when the processor 210 obtains a correlation value for an extracted group of objects. The correlation database may be stored, for example, in the memory 130 of the electronic device of FIG. 1 or may be stored in the server 164 of FIG. 1. If it is stored in the server 164, the processor 210 may communicate with the server 164 via the communication module 230 to search the correlation database.

The server 164 may receive an indication of a set of objects from the processor 210 of the electronic device, and thereafter may search the correlation database and transmit the correlation ID (or another group identifier) corresponding to the set of objects to the processor 210. That is, if the correlation database is stored and operated in the server 164, the operation of searching for the correlation among the plurality of objects may be performed by the server 164 instead of the processor 210 at the request of the processor 210.

FIG. 6 is a schematic diagram illustrating another example of a correlation database, according to aspects of the disclosure. As illustrated, the correlation database may identify different groups of objects. For each group of objects, the database may provide a correlation ID (and/or any other suitable type of group ID). One difference between the correlation database of FIG. 5 and the correlation database of FIG. 6 is that the correlation database of FIG. 6 does not identify a hierarchical relationship between the objects in the specified groups. This in turn may permit the database of FIG. 6 to have a faster response time than the database of FIG. 5.

FIG. 7 is a schematic diagram of an example of an effect database, according to aspects of the disclosure. As illustrated, the effect database may identify a plurality of correlation IDs (or other types of group IDs). For each correlation ID, the effect database may identify at least one target object along with corresponding effect information. The target object may be any one of the group of objects associated with the correlation ID in the correlation database. The effect information may indicate an effect that is to be applied to corresponding target object. For example, the effect information may identify at least one of a text, an image, a video, an audio, and an action link, which are to be applied to the corresponding target object.

The action link may include a command (or a link) for executing a web application, information for accessing an app store, a Uniform Resource Locator (URL) capable of downloading a related application, a phone number, and/or any other suitable type of information. The action link may be displayed in any suitable manner, such as by using an icon, a menu, and the like.

The effect database may be used when the processor 210 selects the target object on the basis of the obtained correlation and selects an effect to be applied to the target object. The effect database may be stored in the memory 130 of the electronic device of FIG. 1 or may be stored in the server 164 of FIG. 1.

For example, if the effect database is stored in the server 164, the processor 210 may communicate with the server 164 via the communication module 230 to search the effect database. Further, the server 164 may receive the correlation ID obtained in the processor 210 of the electronic device, may search the effect database, and thereafter may transmit a target object corresponding to the correlation ID and an effect to be applied to the target object to the processor 210 of the electronic device.

FIG. 8 is a schematic diagram of an example of a combined correlation and effect database. As illustrated, the effect database and the correlation may be integrated together. In that regard, it is to be understood that the disclosure is not limited to any particular manner for storing the relationships and/or mappings discussed with respect to FIGS. 4-7. The term "database" may therefore refer to one/or more of a data structure, table, memory segment, or any other suitable type of record for specifying relationships between different data items.

Figure 9:
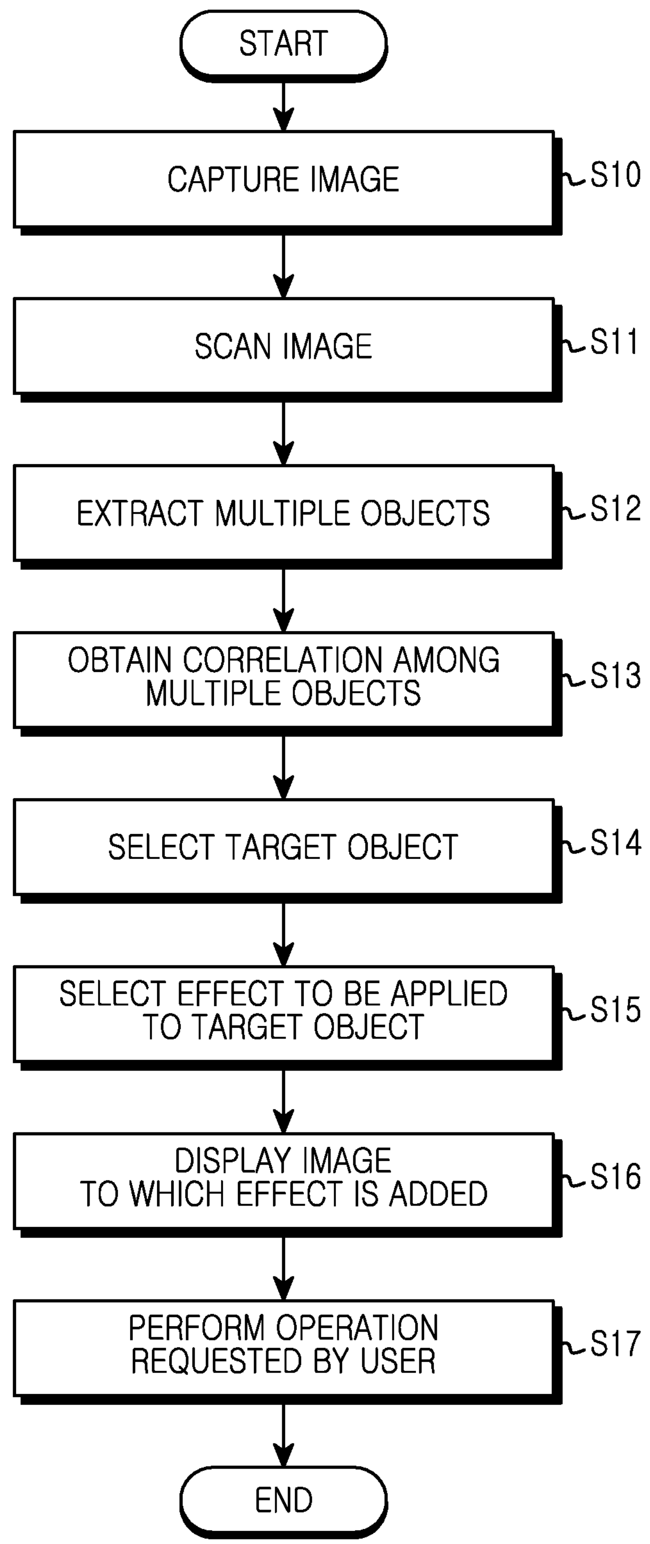
FIG. 9 is a flowchart of an example of a process, according to aspects of the disclosure.

FIG. 9 is a flowchart of an example of a process, according to aspects of the disclosure. According to the process, the processor 210 of the electronic device controls an operation of the display module 260, the application processor 211, and the like, and thus captures an image displayed to the display module (step S10).

The processor 210 scans the captured image (step S11), and detects various feature information such as a brightness (Y), a color, an edge, a pattern, a shape, and the like for at least one object included in the captured image. The processor 210 compares the detected feature information with feature information in an object DataBase (DB), and performs an operation of extracting a plurality of objects for searching for unique object IDs corresponding to the detected feature information (step S12).

The processor 210 compares the object IDs with object IDs in a correlation DB, and obtains a correlation among the plurality of objects (step S13). Thereafter, on the basis of the correlation, the processor 210 searches an effect DB, and selects a target object (step S14), and selects effect information to be applied to the target object (step S15). The processor 210 displays various effects such as a text, an image, a video, an audio, an action linker, and the like by adding the effect to the target object according to the effect information (step S16), and thereafter performs an operation requested by a user (step S17). Accordingly, various effects desired by a user of an electronic device such as a smart phone, a table PC, and the like can be provided in a more convenient and effective manner. Hereinafter, various exemplary embodiments of the present disclosure will be described in a greater detail.

Figure 10:
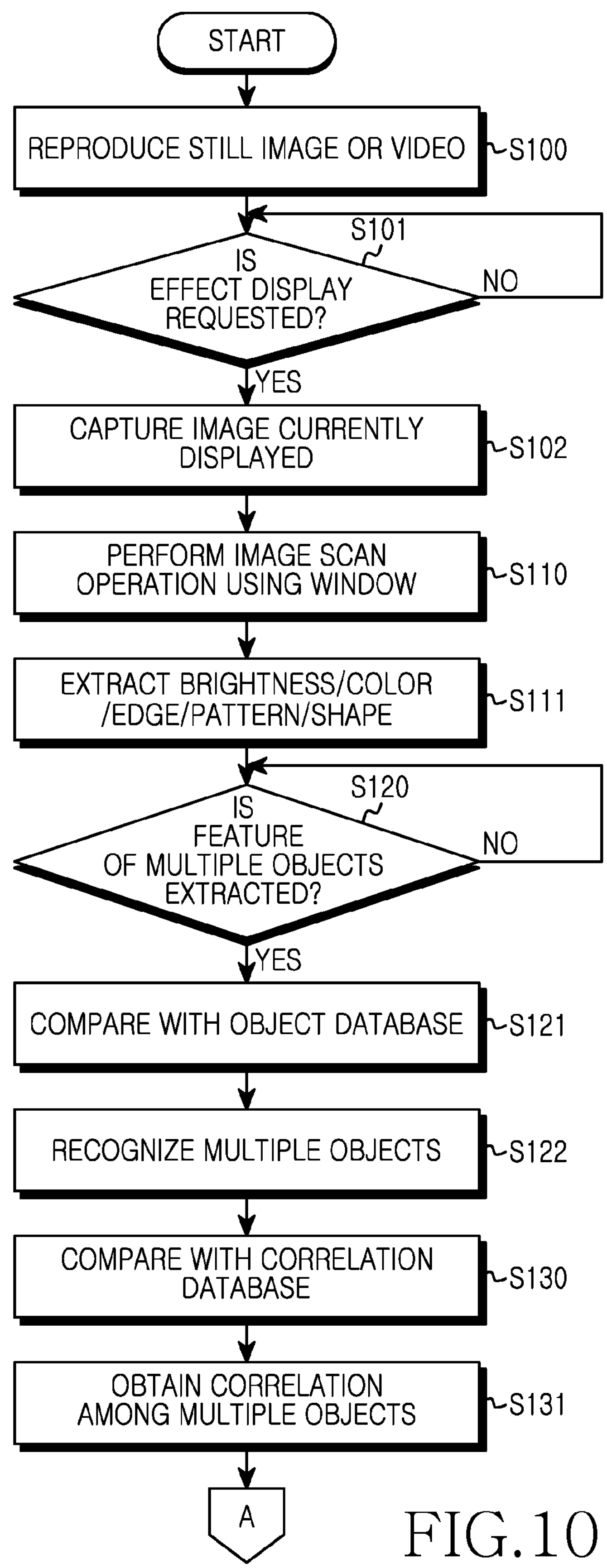
FIG. 10 and FIG. 13 are flowcharts of an example of another process, according to aspects of the disclosure.
Figure 13:
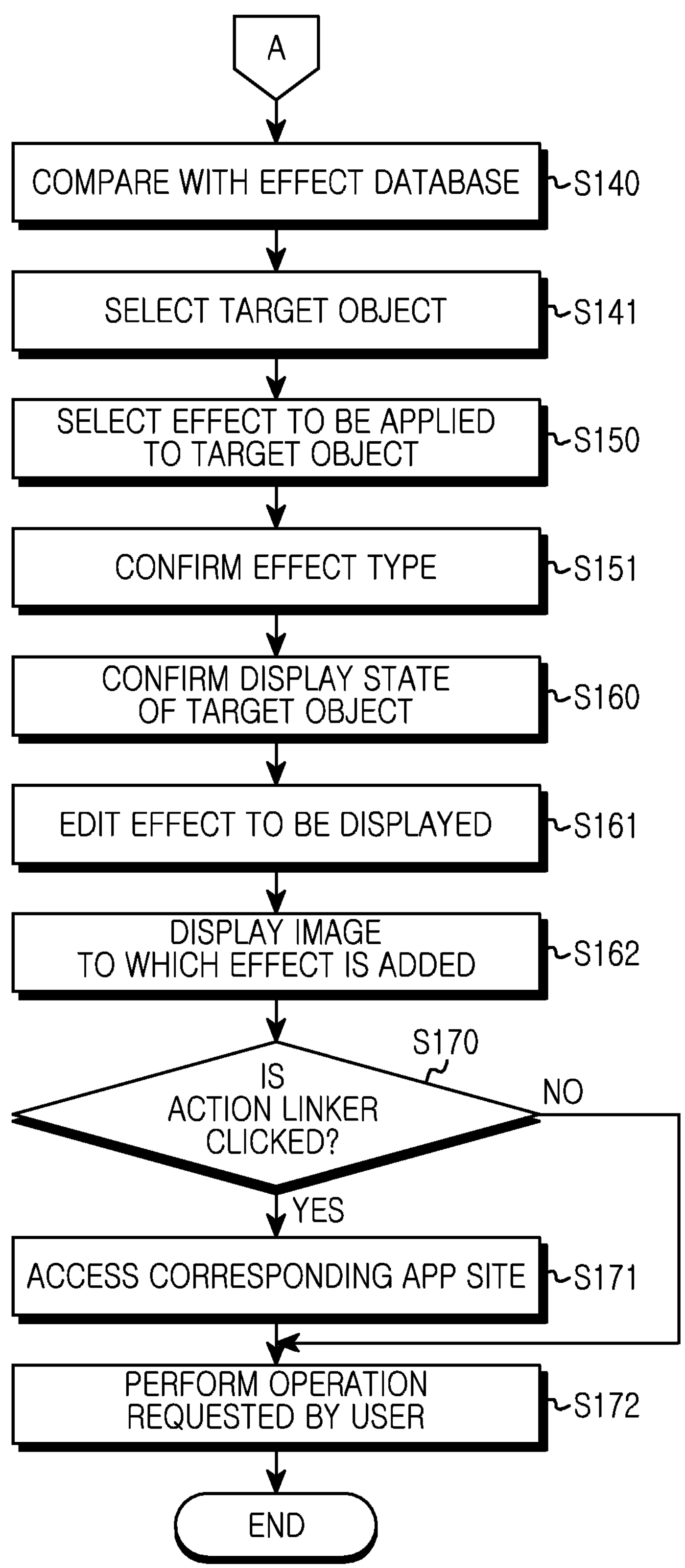

FIGS. 10 and 13 are flowcharts of an example of another process, according to aspects of the disclosure. According to the process, the processor 210 may control an operation of the display module 260, the application processor 211, and the like, and may reproduce a still image (e.g., a photo, etc.) or a video (e.g., a movie, etc.) (step S100).

While performing the aforementioned reproduction operation, if an effect display operation is requested from the user (step S101), the processor 210 captures an image currently displayed to the display module 260 (step S102). For example, if a video such as a movie is displayed to the display module 260, an intra picture of the currently displayed video is captured as a still image.

Figure 11:
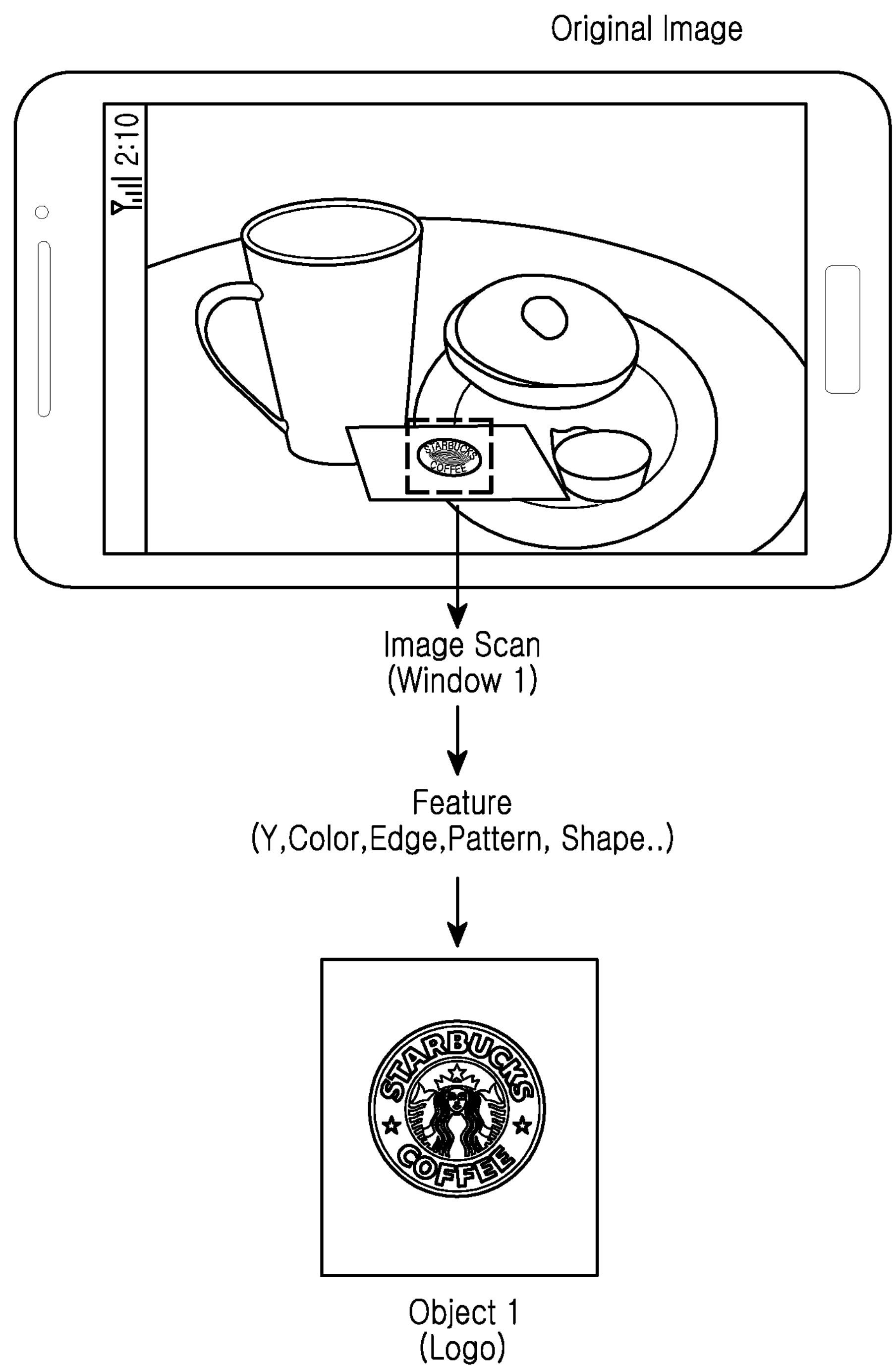
FIG. 11 is a diagram illustrating an example of a process for extracting objects from an image, according to aspects of the disclosure.

The processor 210 performs an image scan operation for detecting feature information of an object included in the image (step S110). The image scan operation may use several types of various techniques. For example, as shown in FIG. 11, the processor 210 performs the image scan operation using a window 1, and detects a variety of feature information (e.g., a brightness, a color, an edge, a pattern, a shape, etc.) for an object 1 included in the image.

Figure 12:
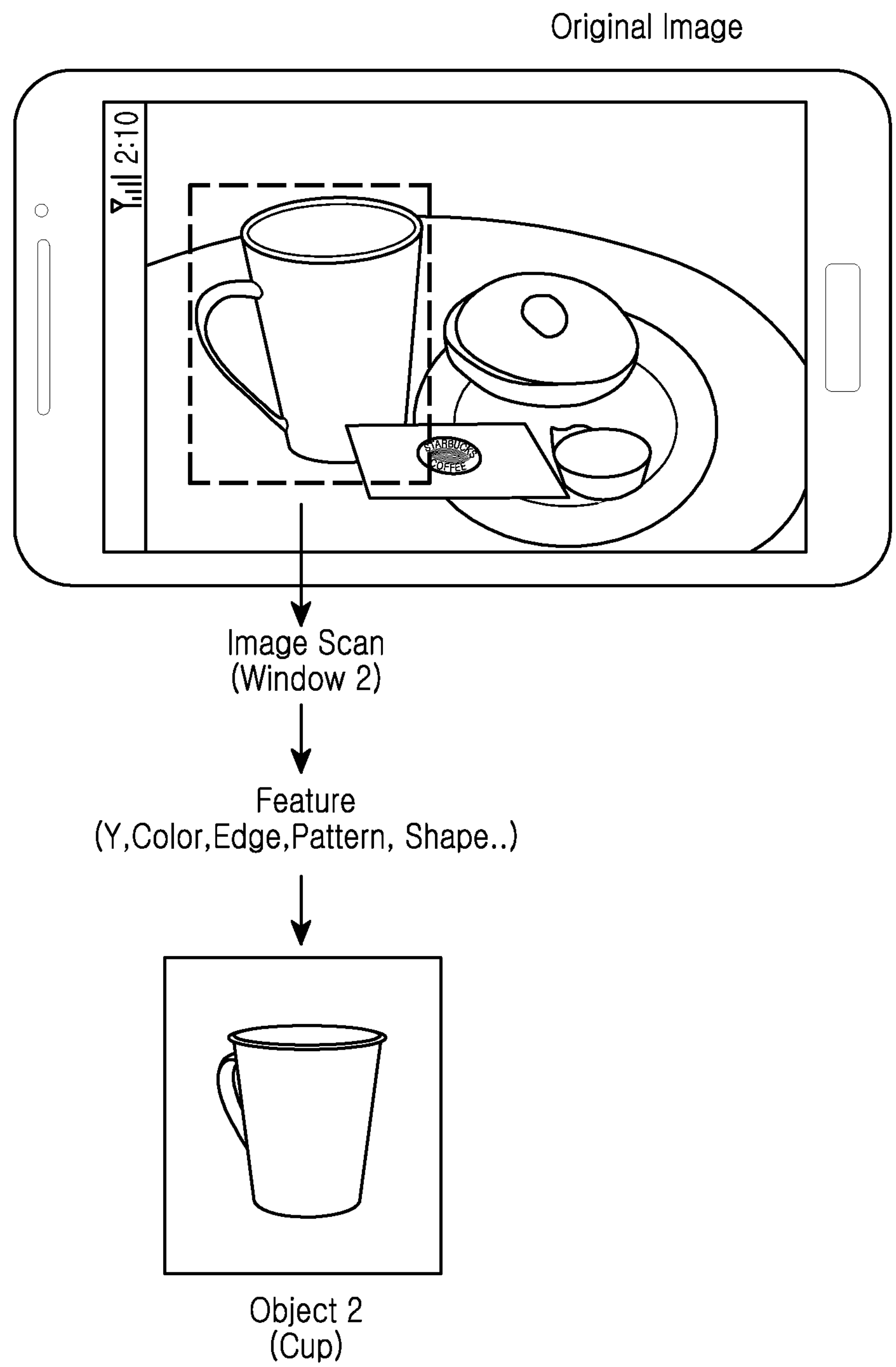
FIG. 12 is a diagram illustrating an example of a process for extracting objects from an image, according to aspects of the disclosure.

Thereafter, as shown in FIG. 12, the processor 210 performs the image scan operation using a window 2, and detects a variety of feature information (i.e., a brightness, a color, an edge, a pattern, a shape, etc.) for an object 2 within the image (step S111). The window 1 and the window 2 may change in size according to a user's selection or a window control algorithm, and the number of windows used for the image scan may be greater than or equal to 2. The object 1 and the object 2 may be designated manually in accordance with a position touched by a user, or may be automatically designated in a process of scanning the entire image.

The object 1 and the object 2 may be included in one image, or may be individually included in a plurality of different images. When feature information regarding the plurality of objects is detected as described above (step S120), the processor 210 compares the detected feature information with feature information in an object DB (step S121). The processor 210 searches for the feature information in the object DB, which is coincide with the detected feature information, and thereafter searches for a unique object ID associated with the found feature information and recognizes the plurality of objects (step S122).

Figure 14:
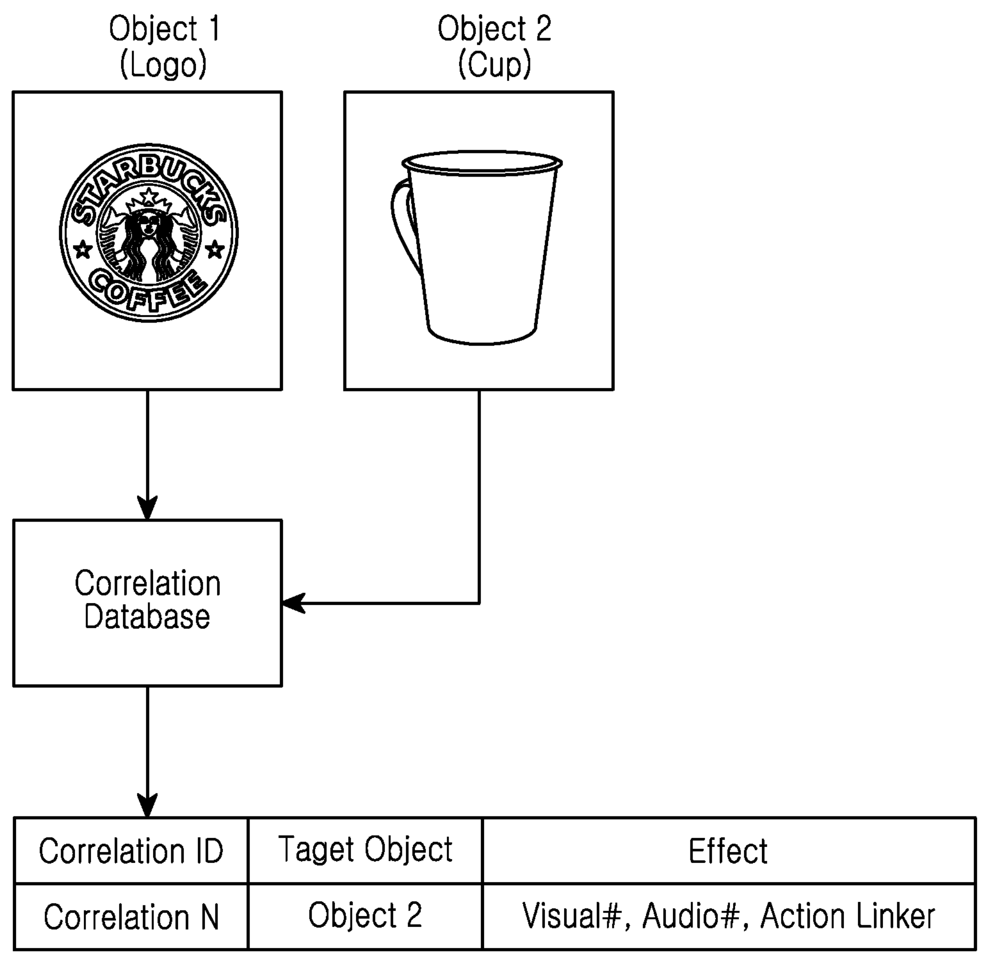
FIG. 14 is a diagram illustrating an example of the operation of the process of FIG. 10 and FIG. 13, according to aspects of the disclosure.

The processor 210 compares the found object ID with a correlation DB (step S130). For example, as shown in FIG. 5, the processor 210 searches for an object of a higher category and an object of a lower category by comparing the objects in a hierarchical manner, and obtains a correlation among the plurality of objects (step S131). The correlation among the plurality of objects may also be obtained by using an interface with the server 160 of FIG. 1. As shown in FIG. 13, the processor 210 compares the obtained correlation with an effect DB (step S140), and selects a target object (step S141). For example, as shown in FIG. 14, between an object 1 corresponding to a logo and an object 2 corresponding to a cup, the object 2 corresponding to the cup may be selected as the target object.

The target object is at least one of the plurality of objects. If the number of objects to which an effect is applied is greater than or equal to 2, two or more target objects may be stored. The processor 201 selects effect information associated with the target object within the effect DB (step S150), and confirms a type of the effect information (step S151). The effect information may be at least one of an image, video, audio, and action linker to be applied to the target object.

The processor 210 confirms a display state of the target object (step S160), and thereafter edits an effect to be displayed additionally to the target object (step S161). For example, as shown in FIG. 15, in an object 2 corresponding to a cup, a still image of a coffee pot pouring coffee may be additionally displayed as an effect 1. For another example, in the object 2 corresponding to the cup, a video of a coffee pot continuously pouring coffee may be displayed additionally using AR as the effect 1. Further, as an effect 2, an action linker may be displayed variously by using a click button or icon for requesting a user click (step S162).

Figure 16:
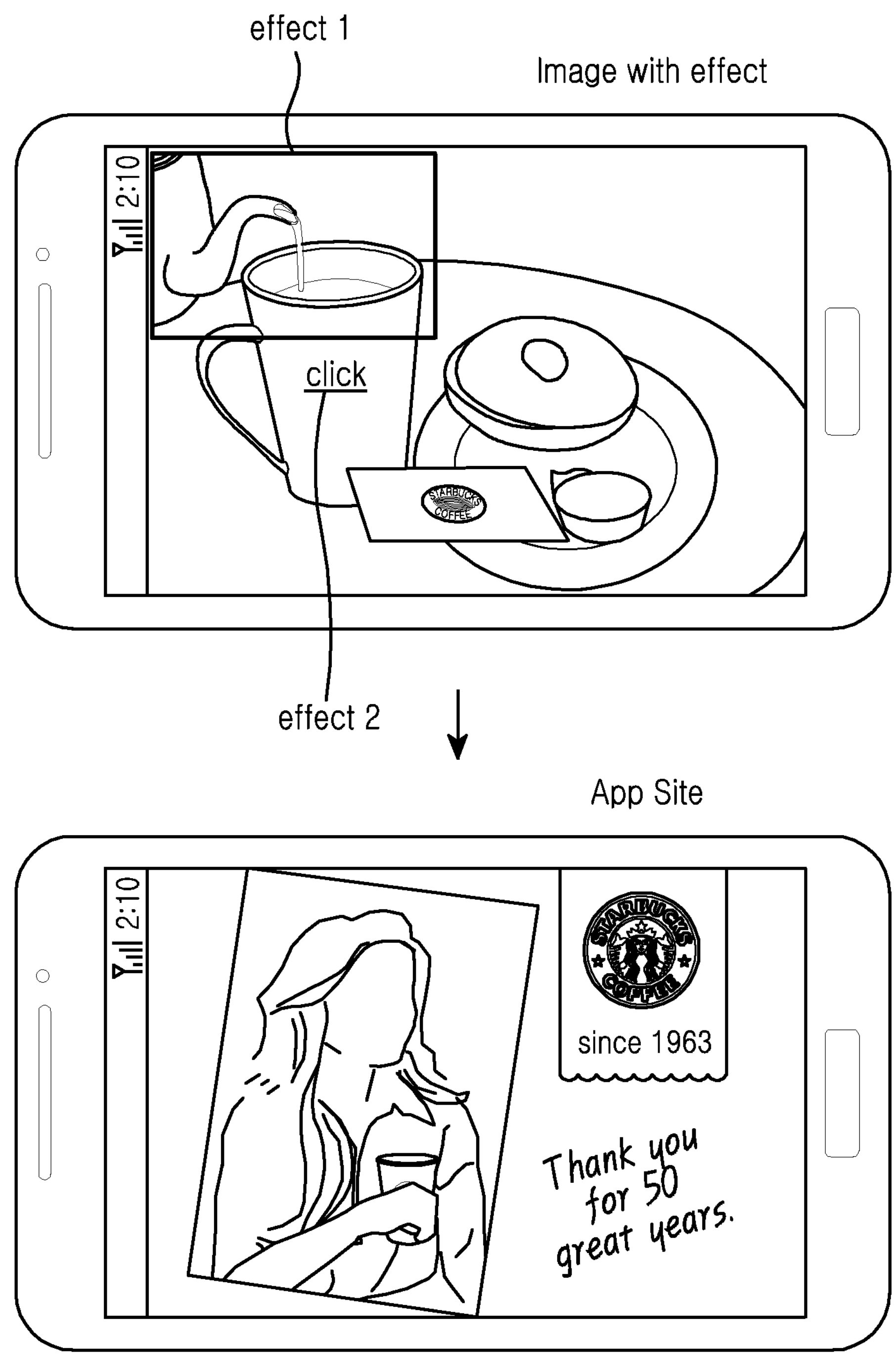

Thereafter, if a user clicks the action linker (step S170), the processor 210 accesses a corresponding app site or web site indicated by the action linker (step S171). For example, as shown in FIG. 16, a specific app site may be accessed by using a URL indicated by the action linker, thereafter a homepage screen or the like is displayed, and thereafter an operation requested by the user may be performed (step S172).

Figure 17:
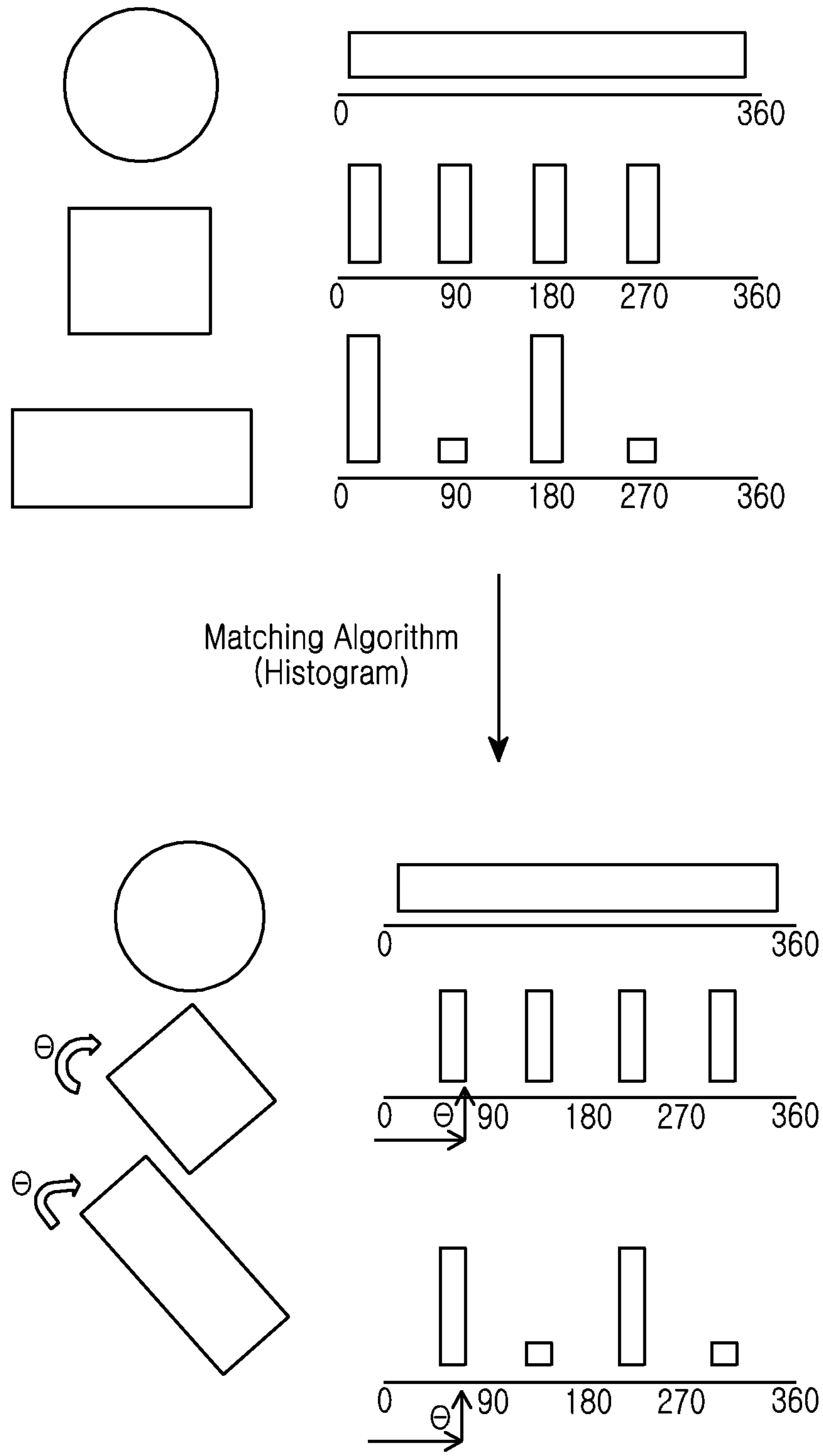
FIG. 17 is a diagram illustrating an example of a matching process, according to aspects of the disclosure.

FIG. 17 illustrates a procedure of applying a matching algorithm according to various exemplary embodiments of the present disclosure. As described above with reference to FIG. 4, a variety of information such as a brightness, a color, an edge, a pattern, a shape, and the like may be stored in an object DB as feature information for each object. For example, the matching algorithm may be used to compare and search for object features by using the pattern information, the shape information, and the like, and in this case, reference pattern information, shape information, and the like stored in the object DB must be modified according to a location, tilt, and the like of a corresponding object.

As shown in FIG. 17, the processor 210 can more accurately search for object feature information by using a matching algorithm of a histogram in which the reference pattern information, shape information, and the like stored in the object DB are compared while changing automatically, on the basis of the location, tilt, and the like of the corresponding object.

Figure 18:
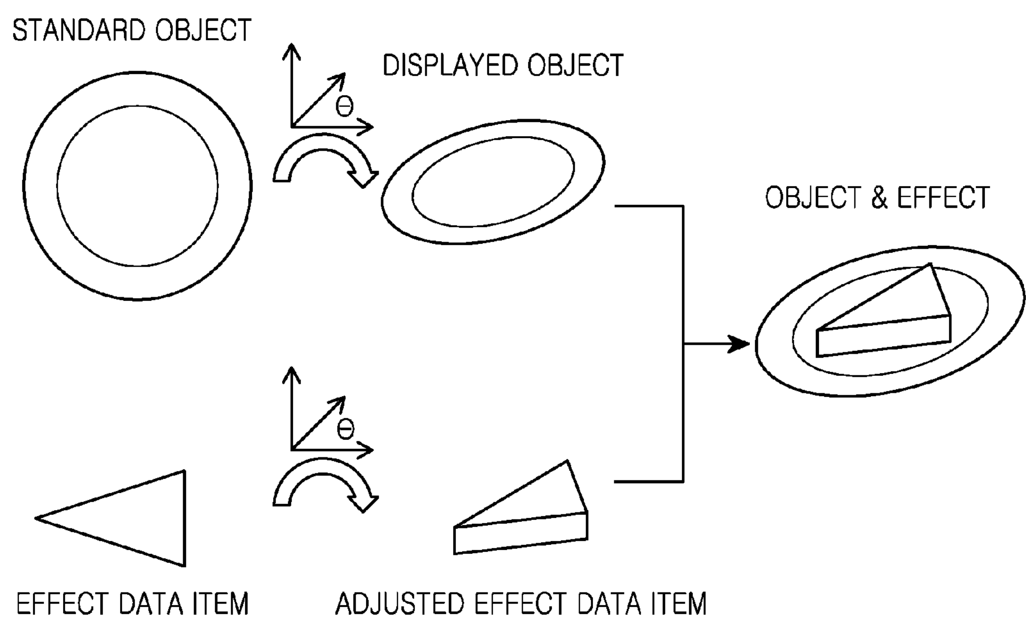
FIG. 18 is a diagram illustrating an example of a process for applying a visual effect to a media item, according to aspects of the disclosure.

FIG. 18 illustrates a procedure of editing an effect and overlapping the effect to an object according to various exemplary embodiments of the present disclosure. For example, as shown in FIG. 18, if an object's tilt analyzed by a matching algorithm of a histogram is a tilt having a specific non-zero value, the processor 210 may edit and change an effect to be added to the object according to the tilt having the specific value, and thereafter may display the effect by overlapping the effect to the object.

Accordingly, feature information of an object detected within an image and feature information stored in an object DB can be more accurately compared, and an effect to be added to a target object can be added and displayed in accordance with a display state of the target object.

Accordingly, feature information of an object detected within an image and feature information stored in an object DB can be more accurately compared, and an effect to be added to a target object can be added and displayed in accordance with a display state of the target object.

According to various exemplary embodiments of the present disclosure, at least one of a plurality of objects can be selected as a target object on the basis of a correlation among the plurality of objects extracted from an image or a video. In addition, since a proper effect can be added to the target object on the basis of the correlation and then can be displayed using AR and the like, it is possible to provide various effects desired by a user of an electronic device such as a smart phone, a tablet PC, and the like.

The examples provided in the disclosure can be implemented in hardware, software, or a combination of both. When implemented in software, computer readable recording medium for storing one or more processor-executable instructions (e.g., software modules) can be provided. Additionally or alternatively, the program can be stored in a memory configured in combination of all or some of these storage media. In addition, the configured memory may be plural in number. Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks.

FIGS. 1-18 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method for operating an electronic device, the method comprising:
- detecting a first object and a second object among a plurality of objects in an image;
- identifying an identifier for the first object and an identifier for the second object based on a database;
- identifying an correlation identifier indicating correlation between the identifier for the first object and the identifier for the second object based on the database;
- determining, based on the correlation identifier, a target object among the first object and the second object;
- generating a third object corresponding to the determined target object; and
- displaying the third object in the image,
- wherein the database is stored in at least one of a memory of the electronic device or a server connected through a network, is configured with a hierarchical structure to provide information regarding correlation between objects, and comprises information regarding an object of a higher category, an object of at least one lower category, and a correlation between the first object and the second object.

2. The method of claim 1, wherein the database comprises information for the target object corresponding to the correlation identifier.

3. The method of claim 1, wherein the detecting the first object and the second object comprising:

detecting a plurality of features for each of the first object and the second object; and determining the first object and second object by comparing the plurality of features with information for a plurality of features regarding the plurality of objects.

4. The method of claim 1, wherein the third object comprises an object for at least one of a text, an image, a video, an audio, and an action linker.

5. The method of claim 1, further comprising:

performing an operation corresponding to a user input by using the displayed third object.

6. The method of claim 1, wherein the third object is generated based on information for at least one of a size, tilt, and angle regarding at least one of the first object and the second object.

7. An electronic device comprising:

a processor configured to:

detect a first object and a second object among a plurality of objects in an image;

identify an identifier for the first object and an identifier for the second object based on a database;

identify an correlation identifier indicating correlation between the identifier for the first object and the identifier for the second object based on the database;

determine, based on the correlation identifier, a target object among the first object and the second object;

generating a third object corresponding to the determined target object; and control to display the third object in the image, wherein the database is stored in at least one of a memory of the electronic device or a server connected through a network, is configured with a hierarchical structure to provide information regarding correlation between objects, and comprises information regarding an object of a higher category, an object of at least one lower category, and a correlation between the first object and the second object.

8. The electronic device of claim 7, wherein the database comprises information for the target object corresponding to the correlation identifier.

9. The electronic device of claim 7, wherein the processor is configured to:

detect a plurality of features for each of the first object and the second object; and determine the first object and second object by comparing the plurality of features with information for a plurality of features regarding the plurality of objects.

10. The electronic device of claim 7, wherein the third object comprises an object for at least one of a text, an image, a video, an audio, and an action linker.

11. The electronic device of claim 7, wherein the processor is further configured to:

perform an operation corresponding to a user input by using the displayed third object.

12. The electronic device of claim 7, wherein the third object is generated based on information for at least one of a size, tilt, and angle regarding at least one of the first object and the second object.

* * * * *